US010667312B2

(12) United States Patent
Yoon et al.

(10) Patent No.: US 10,667,312 B2
(45) Date of Patent: May 26, 2020

(54) REMOTE CONTROLLER AND CONTROL METHOD THEREFORE

(71) Applicant: Samsung Electronics Co., Ltd., Suwon-si, Gyeonggi-do (KR)

(72) Inventors: Sukhoon Yoon, Suwon-si (KR); Chaeyoung Lim, Suwon-si (KR); Minsup Kim, Suwon-si (KR); Jehwan Seo, Suwon-si (KR); Kihyun Song, Suwon-si (KR); Jongkeun Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/419,538

(22) Filed: May 22, 2019

(65) Prior Publication Data

US 2020/0022197 A1    Jan. 16, 2020

(30) Foreign Application Priority Data

Jul. 12, 2018   (KR) ........................ 10-2018-0081141

(51) Int. Cl.
*H04B 17/20*      (2015.01)
*H04W 76/14*     (2018.01)
(Continued)

(52) U.S. Cl.
CPC ........ *H04W 76/14* (2018.02); *H04N 21/4126* (2013.01); *H04W 4/80* (2018.02)

(58) Field of Classification Search
CPC . H04B 117/20; H04B 17/318; H04W 12/003; H04W 24/00; H04W 76/10; H04W 76/14
See application file for complete search history.

(56) References Cited

U.S. PATENT DOCUMENTS 8,064,408 B2   11/2011   Woodsum
8,243,700 B2    8/2012   Moon
(Continued)

FOREIGN PATENT DOCUMENTS

KR   10-0741325    7/2007
KR   10-1568335   11/2015
(Continued)

OTHER PUBLICATIONS

International Search Report and Written Opinion of the International Searching Authority dated Sep. 19, 2019 in International Patent Application No. PCT/KR2019/006504.

*Primary Examiner* — Blane J Jackson
(74) *Attorney, Agent, or Firm* — Staas & Halsey LLP

(57) ABSTRACT

A remote controller includes a communicator to broadcast a first request packet for identifying external apparatuses located around the remote controller, and based on a first response packet for the first request packet being received from each of a plurality of external apparatuses, identify the priorities of the external apparatuses based on the signal strength of the first response packet, and control the communicator to transmit a second request packet for identifying directivity to a first external apparatus among the external apparatuses according to the priorities, and based on a second response packet for the second request packet being received from the first external apparatus, identify directivity for the first external apparatus based on the second response packet, and based on identifying that the remote controller is directed to the first external apparatus, control the communicator to transmit a third request packet for Bluetooth pairing to the first external apparatus.

19 Claims, 14 Drawing Sheets

(51) Int. Cl.
*H04W 4/80* (2018.01)
*H04N 21/41* (2011.01)

(56) References Cited

U.S. PATENT DOCUMENTS

| | | |
|---|---|---|
| 9,730,255 B1 | 8/2017 | Chu et al. |
| 2010/0255782 A1 | 10/2010 | Klemmensen |
| 2013/0051806 A1* | 2/2013 | Quilici .................. G08C 23/04 398/106 |
| 2014/0255025 A1* | 9/2014 | King ..................... G06F 13/385 398/25 |
| 2016/0150066 A1 | 5/2016 | Yae |
| 2016/0278151 A1 | 9/2016 | Kwon et al. |
| 2017/0324489 A1* | 11/2017 | Wells .................... G08C 17/02 |
| 2017/0353979 A1 | 12/2017 | Lee et al. |
| 2018/0181264 A1 | 6/2018 | Jhawar et al. |
| 2018/0372832 A1 | 12/2018 | Ko et al. |

FOREIGN PATENT DOCUMENTS

| | | |
|---|---|---|
| KR | 10-2017-0073162 | 6/2017 |
| WO | 2008/119150 | 10/2008 |

* cited by examiner

<Angle of Arrival Method>

<BT 5.x - AoA Supplemental Packet>

<Measuring the Angle of Arrival>

<Advertising Packet Protocol format>

<REQUEST PACKET>

<NON-AUDIBLE SOUND REQUEST PACKET(Directed Advertising Packet)>

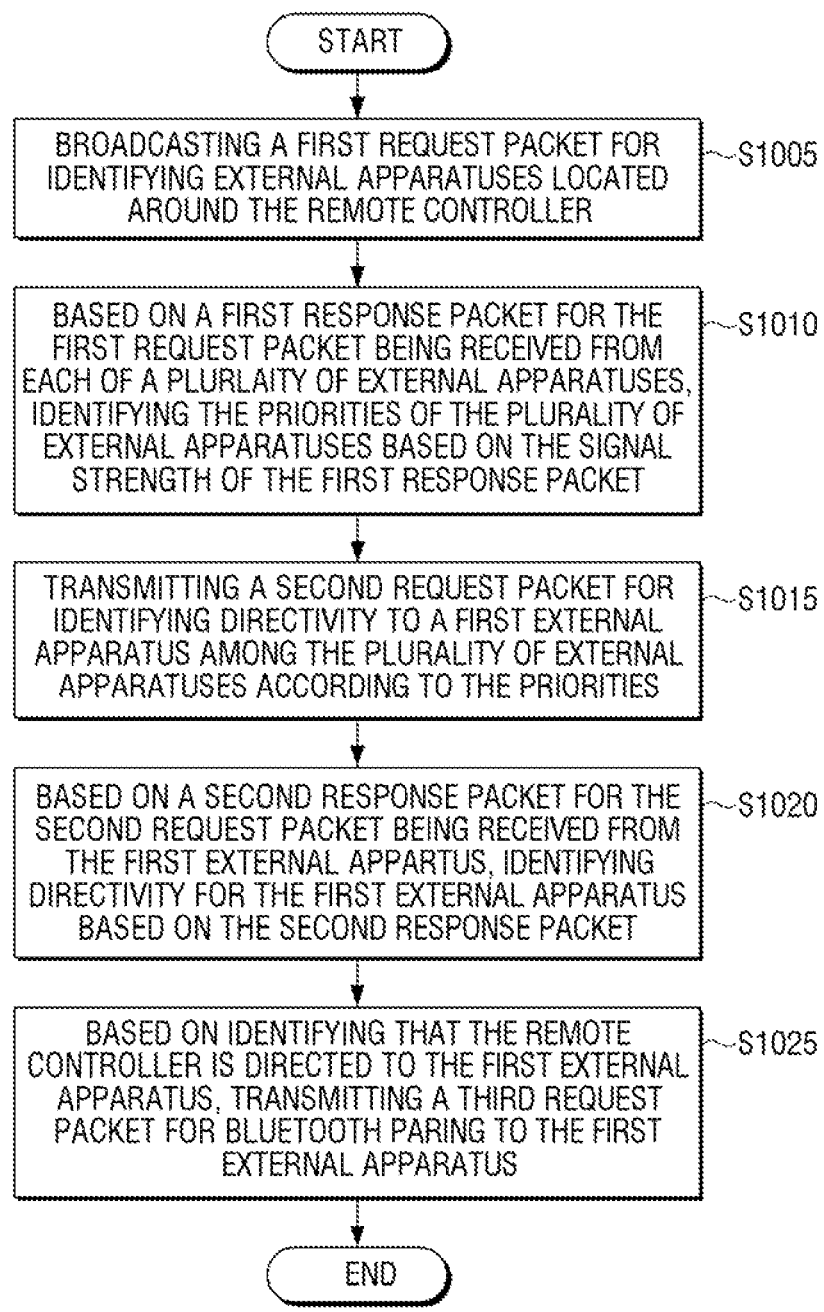

REMOTE CONTROLLER AND CONTROL METHOD THEREFORE

CROSS-REFERENCE TO RELATED APPLICATION(S)

This application is based on and claims priority under 35 U.S.C. § 119(a) to Korean Patent Application No. 10-2018-0081141, filed on Jul. 12, 2018, in the Korean Intellectual Property Office, the disclosure of which is incorporated by reference herein in its entirety.

BACKGROUND

1. Field

The disclosure relates to a remote controller and a control method therefore, and more particularly, to a remote controller that performs Bluetooth pairing with an external apparatus, and a control method therefore.

2. Description of Related Art

Spurred by the development of electronic technologies, various types of electronic apparatuses are being developed and distributed. In particular, most electronic apparatuses used in various places like homes, offices, and public spaces are being implemented such that they can be controlled by remote controllers.

Recently, near field wireless communication like Bluetooth communication is being used frequently, as well as conventional infrared ray communication. For Bluetooth communication, a process of pairing is necessarily required.

In case there are a plurality of electronic apparatuses which are capable of performing Bluetooth pairing around a remote controller, an electronic apparatus that a user wishes to control can be determined based on the direction in which the remote controller is oriented. However, there is a problem that, as signals for determining directivities are received from a plurality of electronic apparatuses simultaneously, amounts of operations for determining a plurality of directivities are overly concentrated in the same time period.

SUMMARY

Additional aspects will be set forth in part in the description which follows and, in part, will be apparent from the description, or may be learned by practice of the presented embodiments.

The disclosure is for addressing the aforementioned problem. Accordingly, the disclosure is aimed at providing a remote controller that determines directivities sequentially according to priorities in consideration of signal strength of response packets, and a control method therefore.

A remote controller according to an embodiment of the disclosure for achieving the aforementioned purpose includes a communicator, and a processor configured to control the communicator to broadcast a first request packet for identifying external apparatuses located around the remote controller, and based on a first response packet for the first request packet being received from each of a plurality of external apparatuses through the communicator, identify the priorities of the plurality of external apparatuses based on the signal strength of the first response packet, and control the communicator to transmit a second request packet for identifying directivity to a first external apparatus among the plurality of external apparatuses according to the priorities, and based on a second response packet for the second request packet being received from the first external apparatus, identify directivity for the first external apparatus based on the second response packet, and based on identifying that the remote controller is directed to the first external apparatus, control the communicator to transmit a third request packet for Bluetooth pairing to the first external apparatus.

Meanwhile, the processor may, based on identifying that the remote controller is not directed to the first external apparatus, control the communicator to transmit the second request packet to the second external apparatus among the plurality of external apparatuses according to the priorities.

Here, the first request packet may be an undirected advertising packet including information corresponding to request to transmit the first response packet, the second request packet may be a directed advertising packet including identification information of the first external apparatus and information corresponding to request to transmit the second response packet, and the third request packet may be a directed advertising packet including identification information of the first external apparatus and information corresponding to request for pairing.

Also, the processor may grant a higher priority to an external apparatus that transmitted the first response packet as the signal strength of the first response packet is larger.

In addition, the processor may control the communicator to transmit a fourth request packet for locality check to the first external apparatus to which the highest priority was granted according to the priorities, and based on non-audible sound output in response to the fourth request packet being received from the first external apparatus, control the communicator to transmit the second request packet to the first external apparatus.

Further, the processor may, based on non-audible sound not being output from the first external apparatus for a predetermined time period after transmission of the fourth request packet, control the communicator to transmit the fourth request packet to the second external apparatus among the plurality of external apparatuses according to the priorities.

Also, the processor may, based on the identified degree of directivity for the first external apparatus exceeding a predetermined error range, transmit the second request packet for identifying directivity to the second external apparatus among the plurality of external apparatuses according to the priorities, and based on the second response packet for the second request packet being received from the second external apparatus, identify the degree of directivity for the second external apparatus, and compare the degree of directivity for the first external apparatus and the degree of directivity for the second external apparatus, and identify one of the first external apparatus or the second external apparatus.

In addition, the processor may compare the degree of directivity for the first external apparatus and the degree of directivity for the second external apparatus, and control the communicator to transmit the third request packet for Bluetooth pairing to the external apparatus for which the degree of directivity is relatively large.

Meanwhile, the second response packet is a packet to which a constant tone for determination of directivity is synthesized, and the processor may, based on phase differences of the second response packets respectively received through the communicators, identify directivity for the first external apparatus.

Meanwhile, a control method for a remote controller according to an embodiment of the disclosure includes the operations of broadcasting a first request packet for identifying external apparatuses located around the remote controller, and based on a first response packet for the first request packet being received from each of a plurality of external apparatuses, identifying the priorities of the plurality of external apparatuses based on the signal strength of the first response packet, transmitting a second request packet for identifying directivity to a first external apparatus among the plurality of external apparatuses according to the priorities, and based on a second response packet for the second request packet being received from the first external apparatus, identifying directivity for the first external apparatus based on the second response packet, and based on identifying that the remote controller is directed to the first external apparatus, transmitting a third request packet for Bluetooth pairing to the first external apparatus.

Also, the control method for a remote controller may further include the operation of, based on identifying that the remote controller is not directed to the first external apparatus, transmitting the second request packet to the second external apparatus among the plurality of external apparatuses according to the priorities.

Meanwhile, the first request packet may be an undirected advertising packet including information corresponding to request to transmit the first response packet, the second request packet may be a directed advertising packet including identification information of the first external apparatus and information corresponding to request to transmit the second response packet, and the third request packet may be a directed advertising packet including identification information of the first external apparatus and information corresponding to request for pairing.

In addition, in the operation of identifying the priorities of the plurality of external apparatuses, a higher priority may be given to an external apparatus that transmitted the first response packet as the signal strength of the first response packet is larger.

Further, the control method for a remote controller may further include the operations of transmitting a fourth request packet for locality check to the first external apparatus to which the highest priority was granted according to the priorities, and based on non-audible sound output in response to the fourth request packet being received from the first external apparatus, transmitting the second request packet to the first external apparatus.

Also, the control method for a remote controller may further include the operation of, based on non-audible sound not being output from the first external apparatus for a predetermined time period after transmission of the fourth request packet, transmitting the fourth request packet to the second external apparatus among the plurality of external apparatuses according to the priorities.

In addition, the control method for a remote controller may further include the operations of, based on the identified degree of directivity for the first external apparatus exceeding a predetermined error range, transmitting the second request packet for identifying directivity to the second external apparatus among the plurality of external apparatuses according to the priorities, and based on the second response packet for the second request packet being received from the second external apparatus, identifying the degree of directivity for the second external apparatus, and comparing the degree of directivity for the first external apparatus and the degree of directivity for the second external apparatus, and identifying one of the first external apparatus or the second external apparatus.

Further, the control method for a remote controller may further include the operation of comparing the degree of directivity for the first external apparatus and the degree of directivity for the second external apparatus, and transmitting the third request packet for Bluetooth pairing to the external apparatus for which the degree of directivity is relatively large.

Here, the second response packet may be a packet to which a constant tone for determination of directivity is synthesized, and based on phase differences of the second response packets respectively received through a plurality of communicators, directivity for the first external apparatus may be identified.

Meanwhile, in a non-transitory computer readable medium storing computer instructions for making an electronic apparatus perform operations in case the instructions are executed by the processor of the electronic apparatus, the operations include the operations of broadcasting a first request packet for identifying external apparatuses located around the remote controller, and based on a first response packet for the first request packet being received from each of a plurality of external apparatuses, identifying the priorities of the plurality of external apparatuses based on the signal strength of the first response packet, transmitting a second request packet for identifying directivity to a first external apparatus among the plurality of external apparatuses according to the priorities, and based on a second response packet for the second request packet being received from the first external apparatus, identifying directivity for the first external apparatus based on the second response packet, and based on identifying that the remote controller is directed to the first external apparatus, transmitting a third request packet for Bluetooth pairing to the first external apparatus.

BRIEF DESCRIPTION OF THE DRAWINGS

The above and other aspects, features, and advantages of particular embodiments of the present disclosure will be more apparent from the following description taken in conjunction with the accompanying drawings, in which:

FIG. 10 is a flow chart for illustrating a control method for a remote controller according to an embodiment of the disclosure.

DETAILED DESCRIPTION

Figure 1A:
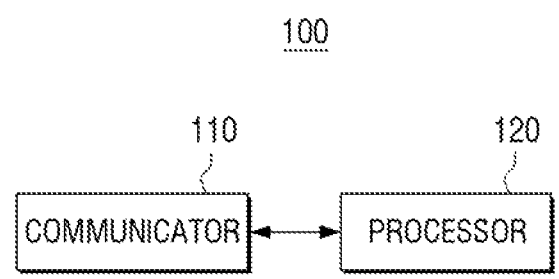
FIGS. 1A and B are block diagrams illustrating a remote controller according to an embodiment of the disclosure.

Before describing the disclosure in detail, the method of describing this specification and the drawings will be described.

First, as terms used in this specification and the claims, general terms were selected, in consideration of the functions described in the various embodiments of the disclosure. However, the terms may vary depending on the intention of those skilled in the art, legal or technical interpretation or emergence of new technologies. Also, there are terms that were arbitrarily designated by the applicant, and the meaning of such terms may be interpreted as defined in this specification. Terms that are not specifically defined in the disclosure may be interpreted based on the overall content of this specification and common technical knowledge in the pertinent art.

Also, the same reference numerals or symbols described in each drawing accompanying this specification indicate parts or components that perform substantially the same functions. For the convenience of explanation and understanding, the parts or components will be described by using the same reference numerals or symbols in different embodiments. That is, even if a plurality of drawings all illustrate components having the same reference numerals, the plurality of drawings do not refer to one embodiment.

Meanwhile, in this specification and the claims, terms including ordinal numbers such as "the first," "the second," etc. may be used for distinguishing components. These ordinal numbers are used to distinguish the same or similar components from one another, and the meaning of the terms are not to be interpreted in a restrictive way due to use of such ordinal numbers. The terms are used only to distinguish one component from another component. For example, the orders of usage or the orders of arrangement, etc. of components combined with such ordinal numbers are not to be restricted by the numbers. Also, depending on needs, each ordinal number may be interchangeably used.

Also, in this specification, singular expressions also include plural expressions as long as they do not refer to obviously differently in the context. In addition, in the disclosure, terms such as "include" or "consist of" should be construed as designating that there are such characteristics, numbers, steps, operations, components, parts or a combination thereof described in this specification, but not to exclude the existence or possibility of adding one or more of other characteristics, numbers, steps, operations, components, parts or a combination thereof.

Further, various modifications may be made to the embodiments of the disclosure, and there may be various types of embodiments. Accordingly, specific embodiments will be illustrated in drawings, and the embodiments will be described in detail in the detailed description. However, it should be noted that the various embodiments are not for limiting the scope of the disclosure to a specific embodiment, but they should be interpreted to include all modifications, equivalents or alternatives of the embodiments included in the ideas and the technical scopes disclosed herein. Meanwhile, in case it is determined that in describing embodiments, detailed explanation of related known technologies may unnecessarily confuse the gist of the disclosure, the detailed explanation will be omitted.

Also, the terms "a module," "a unit," "a part," and the like used in the disclosure are for referring to components performing at least one function or operation, and these components may be implemented as hardware or software, or as a combination of hardware and software. Further, a plurality of "modules," "units," "parts," and the like may be integrated into at least one module or chip and implemented as at least one processor, except "modules," "units," "parts," and the like that need to be implemented as specific hardware.

In addition, in the embodiments of the disclosure, the description that a portion is connected to another portion should be interpreted to include both the case where a portion is directly connected to another portion, and the case where a portion is indirectly connected to another portion through still another medium. Also, the description that a portion includes a component can be interpreted to refer to that other components may additionally be included, but not that other components are excluded, unless there is any specific description meaning the contrary.

FIG. 1(A) is a block diagram illustrating a remote controller according to an embodiment of the disclosure.

A remote controller 100 according to FIG. 1(A) may consist of a communicator 110 and a processor 120.

The communicator 110 is a component that performs communication with various types of external apparatuses according to various types of communication methods. The communicator 110 may perform communication with an electronic apparatus (an external apparatus) within a short distance by using a Bluetooth communication method. Also, the communicator 110 may send (transmit) a request packet to an external apparatus, and receive a response packet from an external apparatus.

The communicator 110 may be implemented as a Bluetooth communication module (or a Bluetooth communication chip). The Bluetooth communication module may include an embedded processor (e.g., a micro controller unit (MCU)), and perform at least some functions related to Bluetooth communication.

A Bluetooth communication method using the IEEE 802.15.1 standard is being used as an industry standard of personal area networks (PANs). A Bluetooth communication method uses 2.45 GHz which is an ISM band, and has an advantage that power consumption is low, and a system can be constituted at a low cost.

Meanwhile, the communicator 110 may receive a specific packet transmitted from each external apparatus. Here, a specific packet may be a packet including directivity information. The processor 120 may perform an overall control operation of an electronic apparatus.

According to an embodiment of the disclosure, the processor 120 may be implemented as a digital signal processor (DSP) processing digital image signals, a microprocessor, and a time controller (TCON). However, the disclosure is not limited thereto, and the processor 120 may include one or more of a central processing unit (CPU), a micro controller unit (MCU), a micro processing unit (MPU), a controller, an application processor (AP) or a communication processor (CP), and an ARM processor, or may be defined by the terms. Also, the processor (120) may be implemented as a system on chip (SoC) having a processing algorithm stored therein or large scale integration (LSI), or in the form of a field programmable gate array (FPGA).

In addition, the processor 120 may control the communicator 110 to broadcast a first request packet for identification of an external apparatus located around the remote controller 100. The first request packet may be an undirected advertising packet including information (or control information or a control command) corresponding to request to transmit first response packet. In addition, the first request packet may be an undirected advertising packet including a control command to transmit first response packet from the external apparatus to the remote controller 100. That is, an undirected advertising packet may be a packet not including information for a destination.

When a first response packet for a first request packet is received from each of a plurality of external apparatuses that received the first request packet through the communicator 110, the processor 120 may identify the priorities of the plurality of external apparatuses based on the signal strength of the first response packet. Also, the processor 120 may identify the signal strength of the first response packet received from the plurality of external apparatuses (not shown). Here, the processor 120 may grant a higher priority to an external apparatus that transmitted the first response packet as the signal strength of the first response packet is larger.

The signal strength of a received packet may be identified by using a received signal strength indicator (RSSI) value. Accordingly, the processor 120 may determine the priorities of a plurality of external apparatuses based on a RSSI value. Meanwhile, all possible other measurement values that are capable of specifying signal strength can obviously be used.

When the priorities of a plurality of external apparatuses are identified, the processor 120 may control the communicator 110 to transmit a second request packet for identifying directivity to a first external apparatus among the plurality of external apparatuses according to the priorities. To be specific, the processor 120 may transmit a second request packet first to an external apparatus of which priority is the highest among the plurality of external apparatuses.

Here, the second request packet may be a directed advertising packet including identification information of the first external apparatus and information (or control information) corresponding to request to transmit the second response packet. Also, the identification information of the first external apparatus here may be a MAC address.

According to an embodiment of the disclosure, the second response packet may be a packet to which a constant tone for determination of directivity is synthesized. For example, a constant tone for calculating a directivity angle may be added to an additional area (e.g., a supplemental field) of a wireless communication packet. The directivity identification or directivity determination may refer to identifying whether the external device is disposed toward the remote control device so as to perform Bluetooth pairing between the remote control device and the external device. Based on the processor 120 identifying that the external device has directivity to the remote controller 100, it can be determined that the external device is disposed to perform Bluetooth pairing with the remote control device.

Also, when a second response packet for a second request packet is received from a first external apparatus, the processor 120 may identify directivity for the first external apparatus based on the second response packet.

FIGS. 2(A) to 2(D) are diagrams for illustrating an operation of analyzing the format of a request packet and a response packet for identifying directivity.

Figure 2A:
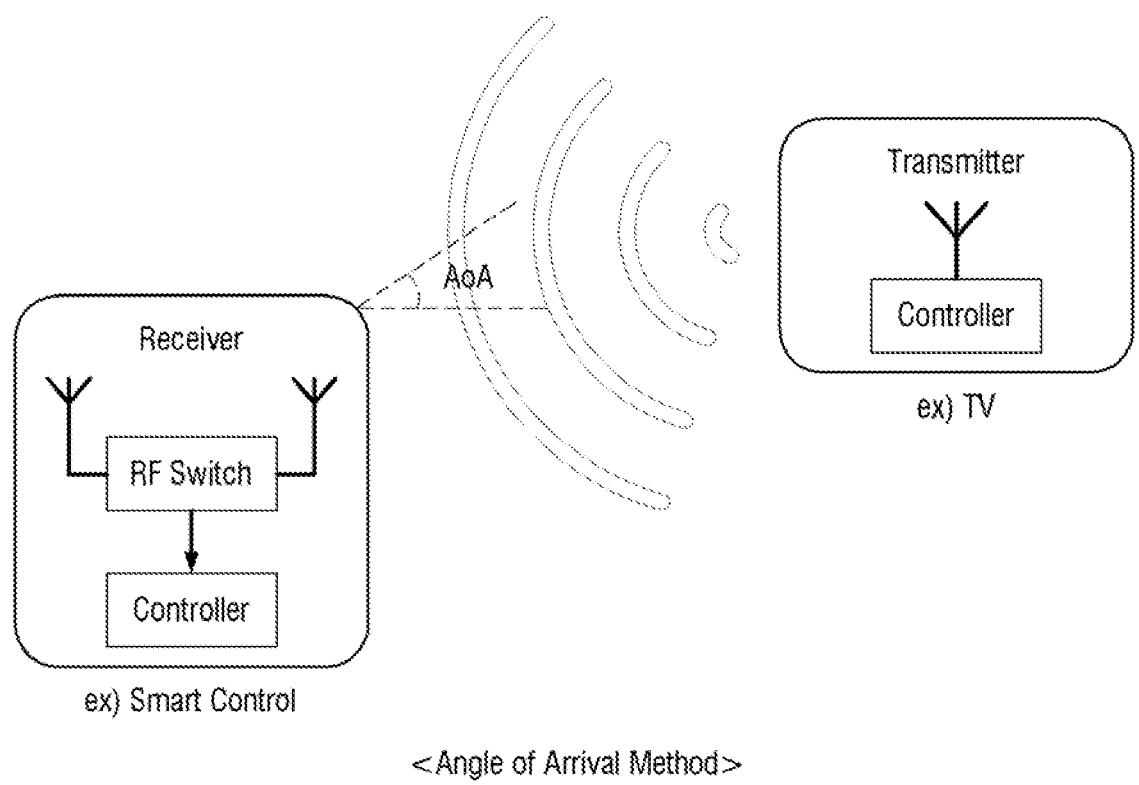
FIGS. 2A, 2B, 2C, 2D are diagrams for illustrating an operation of calculating the angle of a signal received from an external apparatus.

Referring to FIG. 2(A), the remote controller 100 may receive a wireless communication packet (or a wireless communication signal) transmitted from an external apparatus.

For identifying directivity for an external apparatus, the remote controller 100 may use an angle of arrival (AoA) technology. An angle of arrival (AoA) may refer to an angle which is a measurement, in case a signal reaches a reception antenna, of a direction to which a main portion of the energy of the signal reaches based on a horizontal line. Meanwhile, an angle of arrival (AoA) directivity technology may be a positioning method of finding the direction of a signal based on the signal source by measuring an angle of arrival (AoA) of a received signal, and determining the position of the signal source. Accordingly, a directivity angle according to an embodiment of the disclosure may be identified based on an angle of arrival (AoA).

Figure 2B:
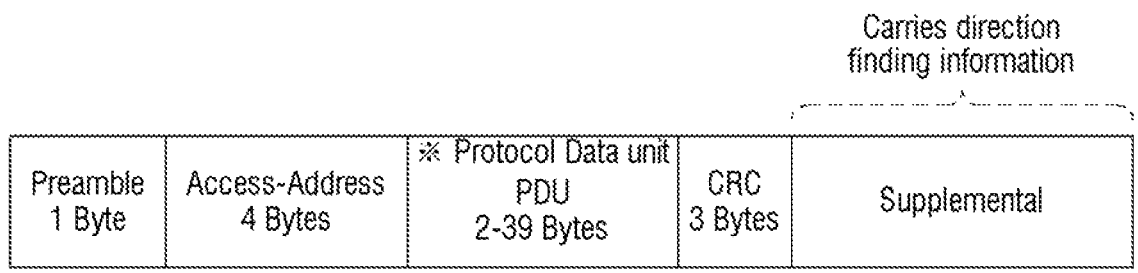

As illustrated in FIG. 2(B), when a radio frequency (RF) signal for determining directivity is transmitted from a TV, a remote controller (e.g., a smart control) may receive the RF signal. In this case, the RF signal may be, for example, a wireless communication packet consisting of a preamble, an access-address, a packet data unit (PDU), and a CRC part, as illustrated in FIG. 2(B). Here, a constant tone may be added to the "supplemental field."

In this case, the remote controller may calculate a directivity angle of the remote controller based on the angle at which the RF signal is received.

Figure 2C:
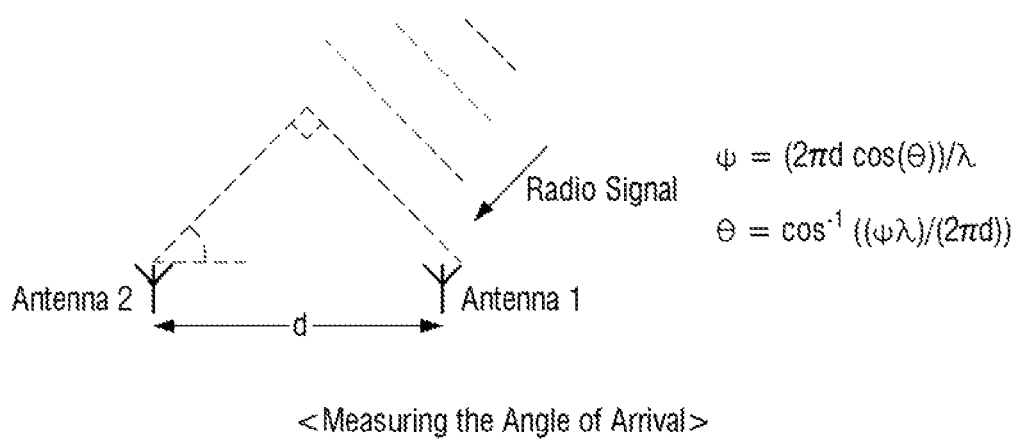

To be specific, the remote controller may receive the RF signal by using at least two antennas, as illustrated in FIG. 2(C). In the case of using at least two antennas, the angles at which the RF signal is received may be respectively calculated. As the positions of a plurality of antennas are different, the angles at which the same signal is received may also be different.

Figure 2D:
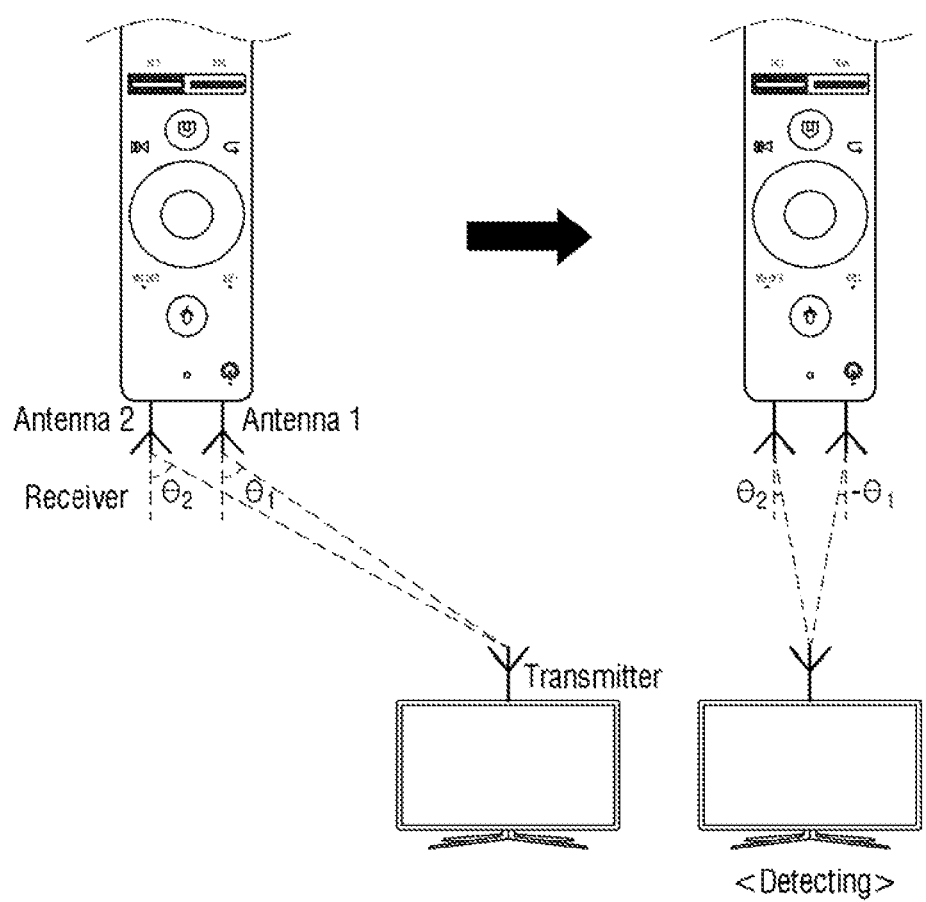

Referring to FIG. 2(D), the direction of an external apparatus that transmitted an RF signal may be predicted by using the angles at which the signal was received at each antenna. Accordingly, it may be identified whether a remote controller is directed to an external apparatus that transmitted the signal.

If it is identified that the processor 120 is directed to a first external apparatus, the processor 120 may control the communicator 110 to transmit a third request packet for Bluetooth pairing to the first external apparatus. The third request packet may be a directed advertising packet including identification information of the first external apparatus and information corresponding to request for pairing. Here, the identification information of the first external apparatus may be a MAC address.

Meanwhile, if it is identified that the processor 120 is not directed to a first external apparatus, the processor 120 may control the communicator 110 to transmit a second request packet to a second external apparatus among a plurality of external apparatuses according to the priorities. The second external apparatus may be an external apparatus having the second highest priority next to the first external apparatus.

Then, the processor 120 may transmit a second request packet requesting a second response packet for identifying directivity sequentially to the next external apparatus according to the priorities, until the directed external apparatus is identified.

As described above, the remote controller 100 according to an embodiment of the disclosure may determine directivity for external apparatuses individually according to the priorities. Thus, the processing speed of the processor 120 of the remote controller 100 becomes fast, and the amounts of operations to be processed can be reduced. In particular, reducing amounts of operations of a MCU included in a portable small device like a remote controller may become a very important factor.

Meanwhile, according to an embodiment of the disclosure, the processor 120 may control the communicator 110 to transmit a fourth request packet to a first external apparatus to which the highest priority was granted according to the priorities. Here, the fourth request packet may be a packet for locality check.

In case non-audible sound is not received from the first external apparatus for a predetermined time period after transmission of the fourth request packet, the processor 120 may control the communicator 110 to transmit a fourth request packet to a second external apparatus among a plurality of external apparatuses according to the priorities. In case non-audible sound is not output for a predetermined time period, the processor 120 may identify that the external apparatus does not exist in the same space.

Meanwhile, the same space may refer to a space where there is no obstacle like a wall. For example, it is supposed that a living room and a separate room are divided by a wall. In this case, it may be expressed that the electronic apparatuses in the living room are in the same space. Also, it may be expressed that the electronic apparatuses in the separate room are in the same space. Further, it may be expressed that the electronic apparatuses in the living room and the electronic apparatuses in the separate room are not in the same space.

In case non-audible sound is not received, the processor 120 may determine that apparatuses are not in the same place, and this determination may be made by using the property of sound waves. For example, in sound waves, waves are transmitted by means of air (a medium), unlike in electromagnetic waves. Thus, it may be difficult for sound waves to pass through a solid material like a wall. Accordingly, in the case of outputting sound waves corresponding to non-audible sound, the sound waves may not pass through an obstacle like a wall. Therefore, in case sound waves corresponding to non-audible sound are not received at the remote controller 100, the processor 120 may determine that there is an obstacle like a wall between the external apparatus and the remote controller 100, and determine that the external apparatus and the remote controller 100 are not in the same space.

If the first external apparatus is not in the same space, the processor 120 may determine that the first external apparatus is not a subject for Bluetooth communication, and may not request directivity information to the first external apparatus. Also, the processor 120 may transmit a fourth request packet requesting outputting of non-audible sound to an external apparatus having the second highest priority next to the first external apparatus.

Meanwhile, if non-audible sound output in response to the fourth request packet is received from the first external apparatus through the microphone of the remote controller 100, the processor 120 may control the communicator 110 to transmit a second request packet to the first external apparatus. That is, if non-audible sound is received, the processor 120 may determine that the first external apparatus is in the same space, and also, determine that the apparatus is a subject for Bluetooth communication, and identify directivity. Then, if it is identified that the first external apparatus is directed, the processor 120 may transmit a third request packet for Bluetooth pairing to the first external apparatus.

Meanwhile, according to an embodiment of the disclosure, in case the identified degree of directivity is within a predetermined error range, the processor 120 may compare the degree of directivity with the degree of directivity for an external apparatus having the second highest priority, and select the external apparatus having relatively large directivity as a subject for Bluetooth pairing.

For example, in case the identified degree of directivity for the first external apparatus is within a predetermined error range, the processor 120 may transmit a second request packet for identifying directivity to a second external apparatus among a plurality of external apparatuses according to the priorities. Then, when a second response packet for the second request packet is received from the second external apparatus, the processor 120 may identify the degree of directivity for the second external apparatus. In case the degree of directivity for the second external apparatus is within a predetermined error range, the processor 120 may compare the degree of directivity for the first external apparatus and the degree of directivity for the second external apparatus, and select the external apparatus having relatively large directivity as a subject for Bluetooth pairing.

Here, a case where a degree of directivity is within a predetermined error range may be a case where a degree of directivity is within a range of having some errors from a predetermined standard for determination of directivity.

For example, the processor 120 may subdivide a degree of directivity, and divide the degree into a first range, a second range, and a third range. The first range may refer to a range of a degree of directivity wherein an apparatus is determined to be directed. Meanwhile, a second range may refer to a range wherein it is unclear to determine whether an apparatus is directed. A third range may refer to a range wherein an apparatus is determined to be not directed.

In case a measured degree of directivity belongs to a second range, the processor 120 may determine that the degree of directivity exceeds a predetermined error range. Also, the processor 120 may store a degree of directivity for a first external apparatus, and then identify a degree of directivity for a second external apparatus having the second highest priority.

Here, the processor 120 may compare the degree of directivity for the first external apparatus and the degree of directivity for the second external apparatus, and identify one of the first and second external apparatuses. To be specific, in consideration of the degree of directivity with a remote controller 100 that a user carries, the processor 120 may identify any one of the first and second external apparatuses such that the external apparatus intended by the user is selected.

Also, the processor 120 may compare the degree of directivity for the first external apparatus and the degree of directivity for the second external apparatus, and control the communicator 110 to transmit a third request packet for Bluetooth pairing to the external apparatus having a relatively large degree of directivity. Here, having a relatively large degree of directivity may refer to that an incidence angle of a signal of directivity identification information received at the remote controller 100 is large. The processor 120 may make a determination such that Bluetooth pairing is performed with an external apparatus for which an incidence angle (a degree of directivity) is relatively small, according to the method of receiving a signal.

The aforementioned examples of the first range to the third range may be appropriate explanation for a case where there are two external apparatuses. In case there are two or more external apparatuses, a more complex process may be applied.

Hereinafter, it will be assumed that the first range indicates that an apparatus is directed, the second range indicates that it is unclear whether an apparatus is directed, and the third range indicates that an apparatus is not directed, as described above. If the directivity angle of the first external apparatus belongs to the second range, determination on directivity for the first external apparatus may be deferred in such a case. Then, the directivity angle of the second external apparatus having the second highest priority may be determined.

In case the directivity angle of the second external apparatus belongs to the first range, the processor 120 may determine the second external apparatus as a subject for Bluetooth pairing, regardless of determination of directivity for the first external apparatus that was deferred.

Meanwhile, in case the directivity angle of the second external apparatus belongs to the second range, the processor 120 may defer both of determination of directivity for the first external apparatus and determination of directivity for the second external apparatus. Then, the processor 120 may determine the directivity angle of the third external apparatus having the next highest priority.

Also, in case the directivity angle of the second external apparatus belongs to the third range, the processor 120 may determine that the second external apparatus is not directed, and may determine the directivity angle of the third external apparatus having the next highest priority, while deferring only determination of directivity for the first external apparatus.

Here, an operation of deferring determination of directivity may be repeated until the directivity angle of an external apparatus having the next highest priority belongs to the first range. Also, in case the directivity angles of all external apparatuses do not belong to the first range even though the directivity angles of all external apparatuses were identified, the processor 120 may determine an external apparatus having a directivity angle which is closest to the first range, among the directivity angles of the external apparatus(es) for which determination of directivity was deferred, as a subject for Bluetooth pairing.

Meanwhile, as described above, the remote controller 100 according to an embodiment of the disclosure may perform an operation of determining directivity separately for a plurality of external apparatuses, and thus overload of amounts of operations may be prevented. Also, a method for preventing overload of amounts of operations may be applied to design of an algorithm and a protocol.

Figure 1B:
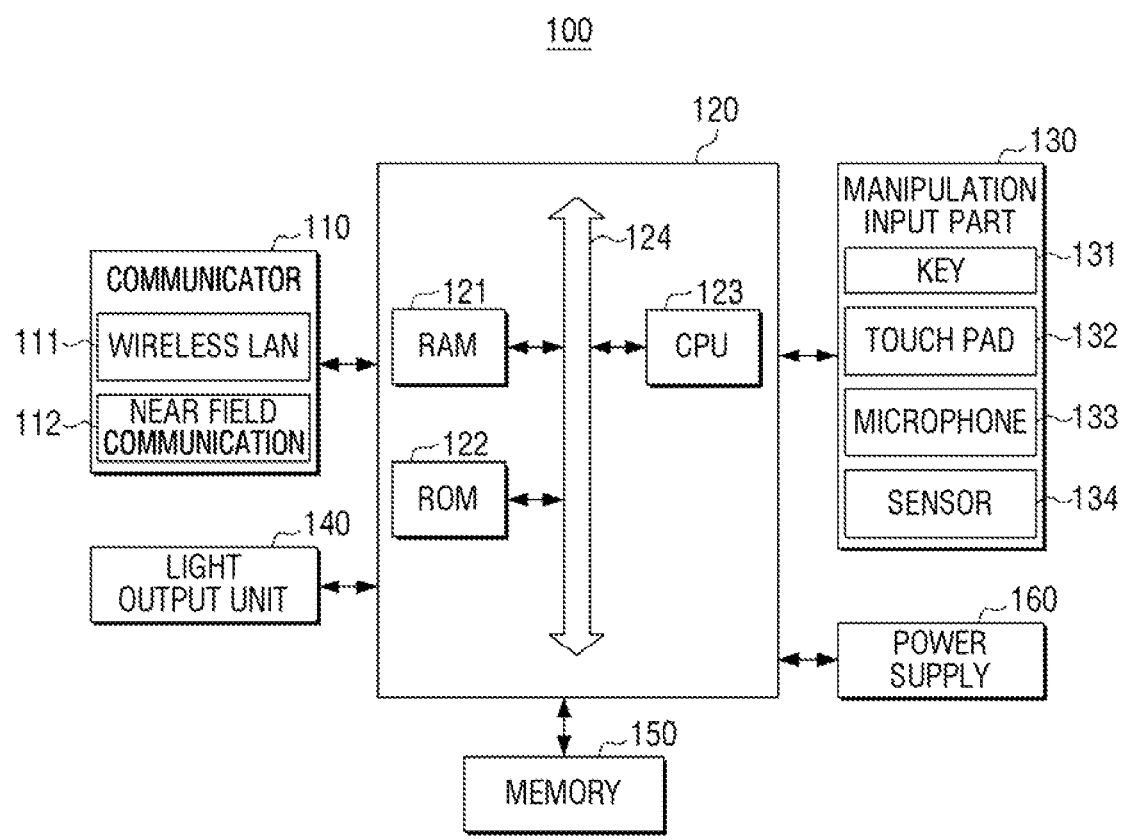

FIG. 1(B) is a block diagram for illustrating a detailed configuration of the remote controller illustrated in FIG. 1(A).

The communicator 110 may transmit a signal requesting wake-up or a signal establishing wireless connection by using a bidirectional communication method. To be specific, the communicator 110 may transmit a signal requesting a response signal to an electronic apparatus, and receive a response signal from the electronic apparatus. Afterwards, the communicator 110 may transmit signals conveying various types of control commands to the electronic apparatus. To be specific, the communicator 110 may transmit signals controlling the electronic apparatus to output sound.

Meanwhile, the communicator 110 includes an IR transmitter, and may transmit a signal requesting wake-up by using a single directional communication method.

Also, the communicator 110 may include at least one of a wireless LAN unit 111 or a near field communication unit 112. For example, the communicator 110 may include one of a wireless LAN unit 111 or a near field communication unit 112, or both of a wireless LAN unit 111 and a near field communication unit 112.

Here, the wireless LAN unit 111 may be connected with an access point (AP) by using wireless communication at a place where an AP is installed, according to control by a control unit. The wireless LAN unit 111 supports a wireless LAN standard (IEEE802.11x) of the Institute of Electrical and Electronics Engineers (IEEE). Meanwhile, the near field communication unit 112 may perform near field communication between a portable apparatus and an external apparatus wirelessly without an AP, according to control by a control unit. Near field communication may include Bluetooth, Bluetooth low energy, IR communication (infrared communication) (IrDa, infrared data association), WI-Fi, ultra wideband (UWB), near field communication (NFC), and the like.

The communicator 110 is a component that performs communication with various types of external apparatuses according to various types of communication methods. The communicator 110 may be connected to an external apparatus through a near field communication network (local area network: LAN) or an Internet network, and may be connected to an external apparatus by a wireless communication method (e.g., wireless communication such as Z-wave, 4LoWPAN, RFID, LTE D2D, BLE, GPRS, Weightless, Edge Zigbee, ANT+, NFC, IrDA, DECT, WLAN, Bluetooth, W-Fi Direct, GSM, UMTS, LTE, WiBRO, etc.). Also, the communicator 110 may include various communication chips such as a WI-Fi chip, a Bluetooth chip, an NFC chip, a wireless communication chip, etc. A Wi-Fi chip, a Bluetooth chip, and an NFC chip may perform communication by a WI-Fi method, a Bluetooth method, and an NFC method, respectively.

A WI-Fi chip and a Bluetooth chip perform communication by a Wi-Fi method and a Bluetooth method, respectively. In the case of using a WI-Fi chip or a Bluetooth chip, various types of connection information such as an SSID, a session key, etc. may be transmitted and received first, and connection of communication may be made by using them, and then various types of information may be transmitted and received.

The processor 120 includes RAM 121, ROM 122, a CPU 123, and a bus 124. The RAM 121, ROM 122, CPU 123, etc. may be connected with one another through the bus 124. Also, the processor 120 may be implemented as a system on chip (SoC).

The RAM 121 may copy data necessary for various operations performed at the processor 120, and store the data temporarily, and transmit the temporarily stored data to the processor 120.

The ROM 122 stores a set of instructions, etc. for system booting. When a turn-on instruction is input and power is supplied, the CPU 123 copies the O/S stored in the memory 150 in the RAM 121 according to the instruction stored in the ROM 122, and boots the system by executing the O/S. When booting is completed, the CPU 123 copies the various types of application programs stored in the memory 150 in the RAM 121, and performs various operations by executing the application programs copied in the RAM 121. The processor 120 may perform various operations by using the modules stored in the memory 150.

The CPU 123 accesses the memory 150, and executes booting by using the O/S stored in the memory 150. Also, the CPU 123 may perform the operation of the processor 120 explained with respect to FIG. 1.

A manipulation input part 130 may output a signal (e.g., an analog signal or a digital signal) corresponding to a received user input (e.g., touch, press, a touch gesture, voice, or a motion) to a control unit.

A key 131 may be a physical component receiving a user input, and may be a plurality of function keys that a user may set or select.

A touch pad 132 may be a physical component receiving a user input, and may correspond to a pointing device replacing a mouse. Also, the touch pad 132 may be implemented as a device wherein input and output are executed at the same time, such as a touch screen.

A microphone 133 may receive input of voice. Also, the microphone 133 may not only receive voice, but also specific sound. In addition, the microphone 133 may receive specific sound transmitted from an electronic apparatus 200. Here, specific sound may not only be sound in an audible area, but also sound in a non-audible area.

Further, the microphone 133 may convert data regarding the received sound to an electronic signal.

Also, the microphone 133 may include various components such as a microphone collecting a user voice in an analog form, an amplifier circuit amplifying the collected user voice, an A/D conversion circuit that samples the amplified user voice, and converts it to a digital signal, a filter circuit that removes noise components from the converted digital signal, etc.

A sensor 134 may measure a physical amount or sense an operational state of an electronic apparatus, and convert the measured or sensed data to an electronic signal. Also, the sensor 134 may include a sensor detecting a motion (e.g., a motion sensor, a gyro sensor, an acceleration sensor, a gravity sensor, etc.).

A light output unit 140 outputs a light signal (including, for example, a control signal) corresponding to a received user input (e.g., touch, press, a touch gesture, voice, or a motion) to a light reception unit of an electronic apparatus 200, according to control by a control unit. Meanwhile, as a remote controller code format used at a remote controller 100, one of a remote controller code format which is an exclusive format of the manufacturer or a generic-purpose remote controller code format may be used. A remote controller code format may include a leader code and a data area (data word). A light signal output may be modulated to a carrier wave and be output. A control signal may be stored in the memory 150, or generated by a control unit. The remote controller 100 may include an infrared-laser emitting diode (IR-LED).

The memory 150 may store various types of data, programs or applications for driving and controlling the remote controller 100 by control by a control unit. The memory 150 may store an input or output signal or data corresponding to operation of the communicator 110, the light output unit 140, and a power supply 160. Also, the memory 150 may store a control signal corresponding to a received user input (e.g., touch, press, a touch gesture, voice, or a motion) according to control by a control unit.

The memory 150 may be implemented as non-volatile memory, volatile memory, flash memory, a hard disk drive (HDD), or a solid state drive (SSD), etc. Meanwhile, the memory 150 may be implemented not only as a storage medium inside the electronic apparatus 200, but also as an external storage medium, e.g., a micro SD card, a USB memory, or a Web server through a network, etc.

The power supply 160 supplies power to components (110 to 150) inside the remote controller 100 by control by a control unit. The power supply 160 may supply power to the components (110 to 150) inside from a battery or two or more batteries (not shown) located inside the remote controller 100. The batteries may be located between the key 131 and the touch pad 132 located on the surface of the remote controller 100 and the rear surface cover (not shown).

Regarding the components illustrated in the remote controller 100 in FIG. 2, at least one component may be added or deleted in response to the performance of the remote controller 100. Also, it will be easily understood by a person having ordinary knowledge in the pertinent technical field that the locations of the components may be changed in response to the performance or structure of the remote controller 100.

Figure 3:
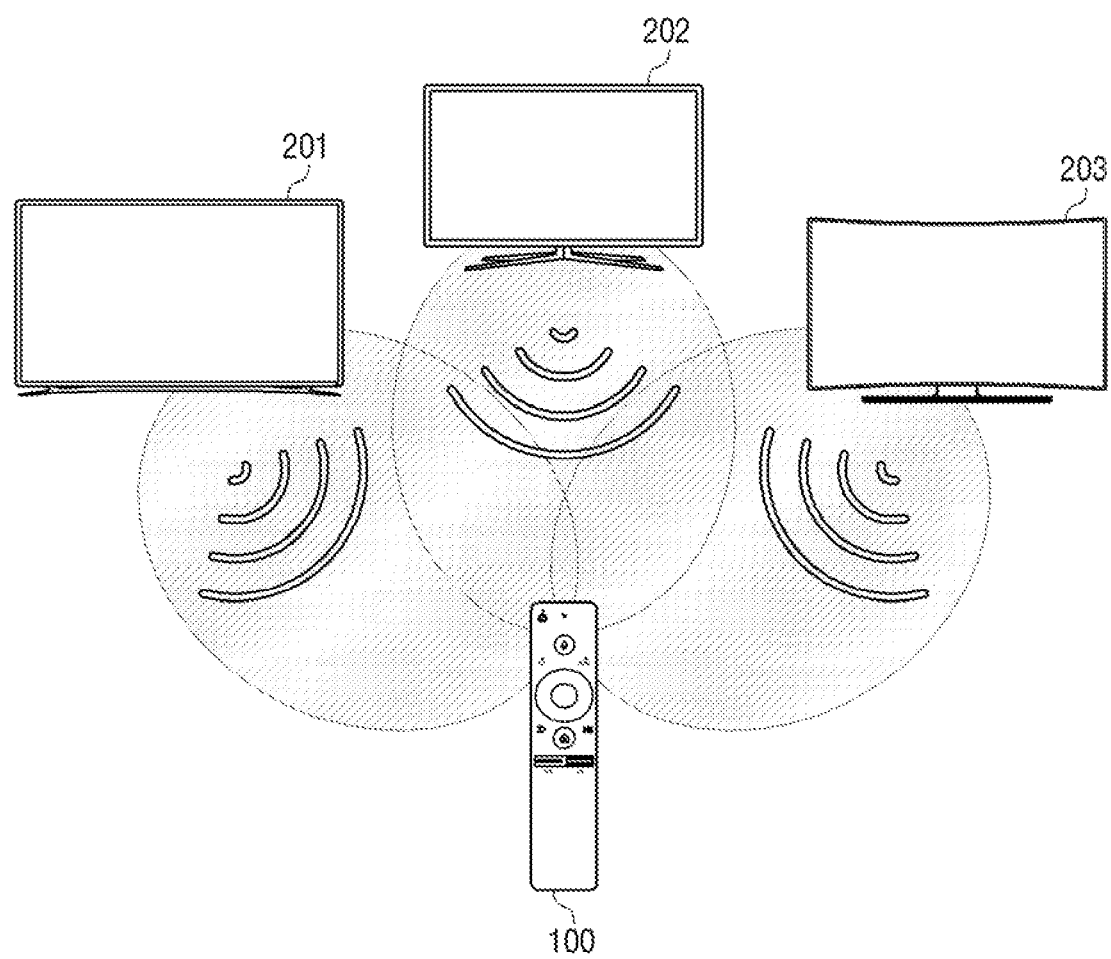
FIG. 3 is a diagram for illustrating a relation between a remote controller according to an embodiment of the disclosure and a plurality of external apparatuses that can be connected through Bluetooth.

FIG. 3 is a diagram for illustrating a relation between a remote controller according to an embodiment of the disclosure and a plurality of external apparatuses that can be connected through Bluetooth.

Referring to FIG. 3, one remote controller 100 and a plurality of external apparatuses 201 to 203 may exist in one space. Meanwhile, ambient apparatuses that may be connected to the remote controller 100 by Bluetooth pairing may not be of the same type, and the plurality of external apparatuses 201 to 203 may be various types of electronic apparatuses.

In general, Bluetooth pairing is based on 1:1 connection, in principle. Accordingly, in order to perform Bluetooth connection with the remote controller 100, Bluetooth pairing of the remote controller 100 should be performed with one external apparatus.

In case there is one external apparatus, the remote controller 100 may just need to perform Bluetooth pairing with one external apparatus without a particular problem. However, if there are a plurality of external apparatuses, the remote controller 100 should choose any one external apparatus for performing Bluetooth pairing.

The remote controller 100 according to an embodiment of the disclosure may select an apparatus by determining directivity. Determination of directivity may be determination of whether electronic apparatuses performing Bluetooth pairing maintain a specific angle between each other. For example, in case the remote controller 100 is directed to the front surface of an external apparatus, the remote controller 100 may determine that the external apparatus is directed.

Accordingly, the remote controller 100 may identify directivity for the plurality of external apparatuses 201 to 203 for which Bluetooth pairing is possible, and the remote controller 100 may select an external apparatus maintaining a predetermined angle as an external apparatus for Bluetooth pairing.

In general, in case there are a plurality of external apparatuses 201 to 203, the remote controller 100 receives identification information from each of the plurality of external apparatuses 201 to 203. Then, the remote controller 100 processes the identification information received from the plurality of external apparatuses 201 to 203 simultaneously. In this case, the remote controller 100 performs a plurality of operation processes at the same time, and thus the amounts of operations may increase, and the speed of operations may decrease.

However, the remote controller 100 of the disclosure may reduce operation processes and amounts of operations, by using a control method illustrated in FIG. 4 that will be described below.

Figure 4:
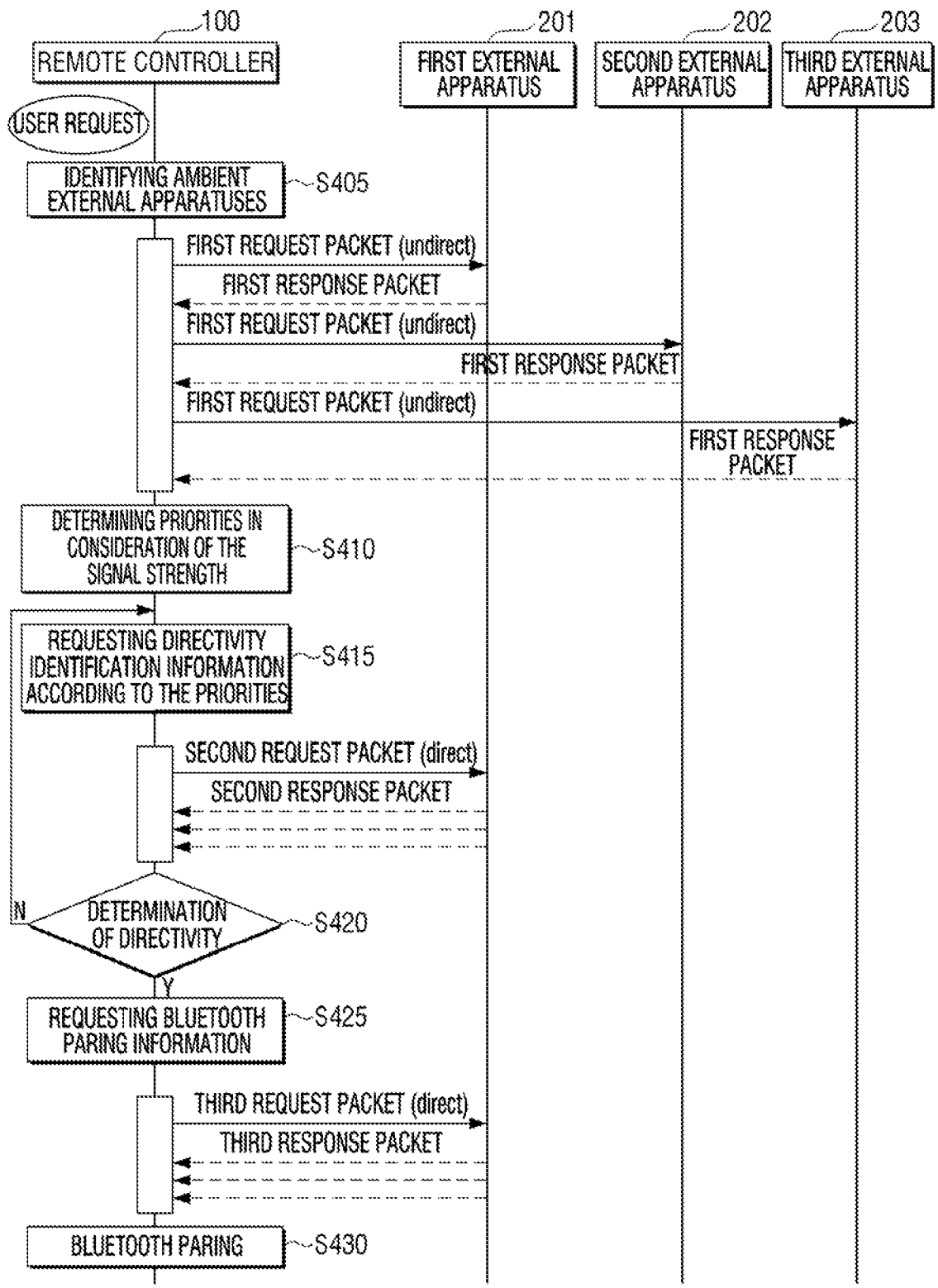
FIG. 4 is a flow chart for illustrating an operation of a remote controller according to the example of FIG. 3.

FIG. 4 is a flow chart for illustrating an operation of a remote controller according to the example of FIG. 3.

Referring to FIG. 4, the remote controller 100 may perform Bluetooth pairing with an ambient external apparatus. In case there is a user's request, i.e., if the remote controller 100 recognizes an input corresponding to a user's instruction to perform Bluetooth pairing, the remote controller 100 may initiate an operation for Bluetooth pairing.

When the remote controller 100 recognizes an instruction for performing Bluetooth pairing, the remote controller 100 may identify an ambient external apparatus for performing Bluetooth pairing at operation S405. Here, the remote controller 100 may transmit a first request packet for identifying an ambient external apparatus. The first request packet may be an undirected advertising packet, and may transmit a packet without deciding a specific subject. Also, the first request packet may include a control command requesting a response packet. An external apparatus that received the first request packet may transmit a corresponding response packet.

To be specific, the plurality of external apparatuses 201 to 203 that received the first request packet may respectively transmit a first response packet to the remote controller 100. The first response packet may include identification information of each of the plurality of external apparatuses 201 to 203. Here, the identification information may be a MAC address.

The remote controller 100 may analyze the first response packet received from each of the plurality of external apparatuses 201 to 203, and the remote controller 100 may determine the priorities. The remote controller 100 may determine the priorities in consideration of the signal strength at operation S410. Further, the remote controller 100 may identify the signal strength when receiving the first response packet from the plurality of external apparatuses 201 to 203. The signal strength of the packet respectively received may be identified by using a received signal strength indicator (RSSI) value. The remote controller 100 may identify the signal strength of the first response packet respectively received by using an RSSI value. Then, the remote controller 100 may determine the priorities based on the signal strength.

For example, the remote controller 100 may grant a higher priority to an external apparatus that transmitted a packet with a larger signal strength. Here, it is assumed that the RSSI value is the highest at the first external apparatus 201, and the RSSI value is measured to be lower in the order of the second external apparatus 202 and the third external apparatus 203. The remote controller 100 may grant the highest priority to the first external apparatus 201, and grant the next highest priorities in the order of the second external apparatus 202 and the third external apparatus 203.

Also, the remote controller 100 may request directivity identification information to the external apparatuses according to the priorities at operation S415. Also, the remote controller 100 may transmit a second request packet to the external apparatus having the highest priority. Here, the second request packet may be a directed advertising packet. Also, the second request packet may be a packet of which subject for reception has been decided, and the second request packet may include a control command to transmit identification information for determination of directivity of the subject for reception. When a second response packet including a predetermined signal is received from an external apparatus, the remote controller 100 may determine directivity by using the second response packet. Here, identification information for determination of directivity may be information used for determining directivity at the remote controller 100, and identification information for determination of directivity may include the aforementioned predetermined signal. Also, identification information for determination of directivity and unique identification information of an external apparatus may be included in a second response packet.

The remote controller 100 may analyze the second response packet received from an external apparatus, and determine whether the remote controller 100 and the external apparatus are directed at operation S420. Also, the remote controller 100 may analyze predetermined signals included in the remote controller 100 and the second response packet, and determine a degree of directivity between the remote controller 100 and the external apparatus.

If the degree of directivity with the external apparatus is outside a predetermined range, the remote controller 100 may determine that the remote controller 100 and the external apparatus are not directed. Then, the remote controller 100 may transmit a new second request packet to an external apparatus having the next highest priority. The remote controller 100 may transmit a second request packet to a new external apparatus until an external apparatus having a degree of directivity within a predetermined range is identified. Meanwhile, if the degree of directivity with all external apparatuses is outside a predetermined range, the remote controller 100 may not perform Bluetooth pairing with any external apparatus.

In case the degree of directivity with an external apparatus is within a predetermined range, the remote controller 100 may determine that the remote controller 100 and the external apparatus are directed. Then, the remote controller 100 may request identification information for Bluetooth pairing to an external apparatus having a degree of directivity within a predetermined range at operation S425.

To be specific, the remote controller 100 may transmit a third request packet to an external apparatus having a degree of directivity within a predetermined range. The third request packet may include a control command to transmit identification information related to Bluetooth pairing. Also, the third request packet may be a directed advertising packet.

Then, the remote controller 100 may receive a third response packet corresponding to the third request packet from an external apparatus having a degree of directivity within a predetermined range. The third response packet may include identification information for Bluetooth pairing and unique identification information of the external apparatus.

When the remote controller 100 receives a third response packet from an external apparatus having a degree of directivity within a predetermined range, the remote controller 100 may perform Bluetooth pairing with the external apparatus by using the information included in the received third response packet at operation S430.

Figure 5:
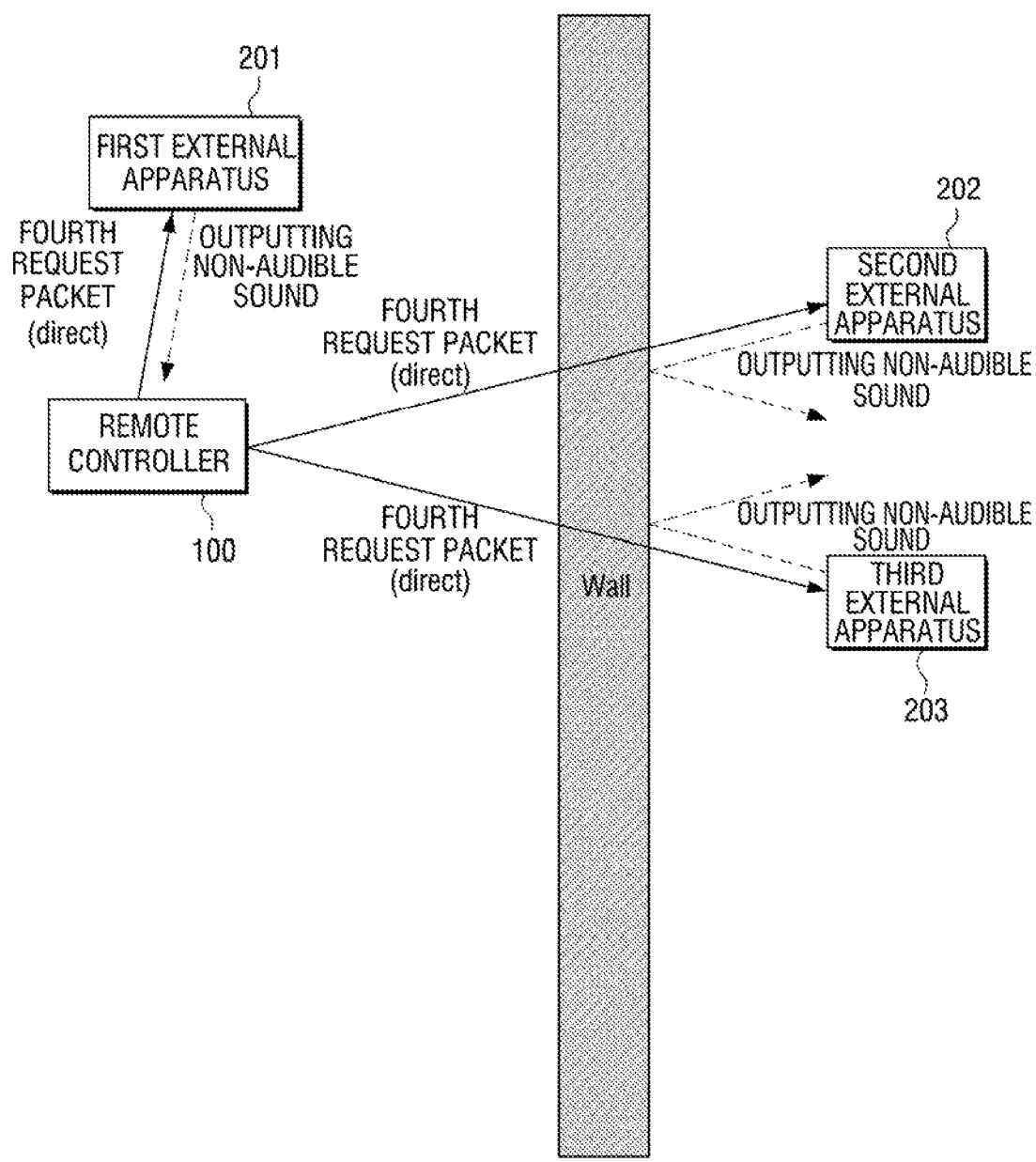
FIG. 5 is a diagram for illustrating a relation between a remote controller according to an embodiment of the disclosure and a plurality of external apparatuses that can be connected through Bluetooth.

FIG. 5 is a diagram for illustrating a relation between a remote controller according to an embodiment of the disclosure and a plurality of external apparatuses that can be connected through Bluetooth.

Referring to FIG. 5, a remote controller 100 and a plurality of external apparatuses 201 to 203 may exist. Here, the remote controller 100 and a first external apparatus 201 may exist in the same space, and a second external apparatus 202 and a third external apparatus 203 may exist in separate spaces blocked by a wall.

Here, it is assumed that through a wall that separated a space into separate spaces, sound (non-audible sound) cannot be transmitted. That is, it is assumed that sound (non-audible sound) output in one space cannot be transmitted to another space through the wall.

Also, it is assumed that a fourth request packet including a control command for the plurality of external apparatuses 201 to 203 to output non-audible sound was transmitted from the remote controller 100. The fourth request packet is constituted by a wireless communication method, and thus it can be transmitted through a wall.

The plurality of external apparatuses 201 to 203 that received a control command to output non-audible sound may output non-audible sound. As the remote controller 100 and the first external apparatus 201 are in the same space, the remote controller 100 may receive non-audible sound output at the first external apparatus 201.

However, the remote controller 100 is not in the same space with the second external apparatus 202 and the third external apparatus 203, and they are blocked from one another by a wall. Thus, the remote controller 100 cannot receive non-audible sound output at the second external apparatus 202 and the third external apparatus 203.

Accordingly, in case the remote controller 100 received non-audible sound for a specific time period, the remote controller 100 may determine that only the external apparatus that transmitted the non-audible sound exists in the same space. For example, the remote controller 100 may receive only the non-audible sound output at the first external apparatus 201 for a predetermined time period after transmitting a fourth request packet. Also, the remote controller 100 may determine that only the first external apparatus 201 is in the same space. In addition, the remote controller 100 may determine that the second external apparatus 202 and the third external apparatus 203 are in separate spaces.

A detailed control method related to the above example will be explained with respect to FIG. 6.

Figure 6:
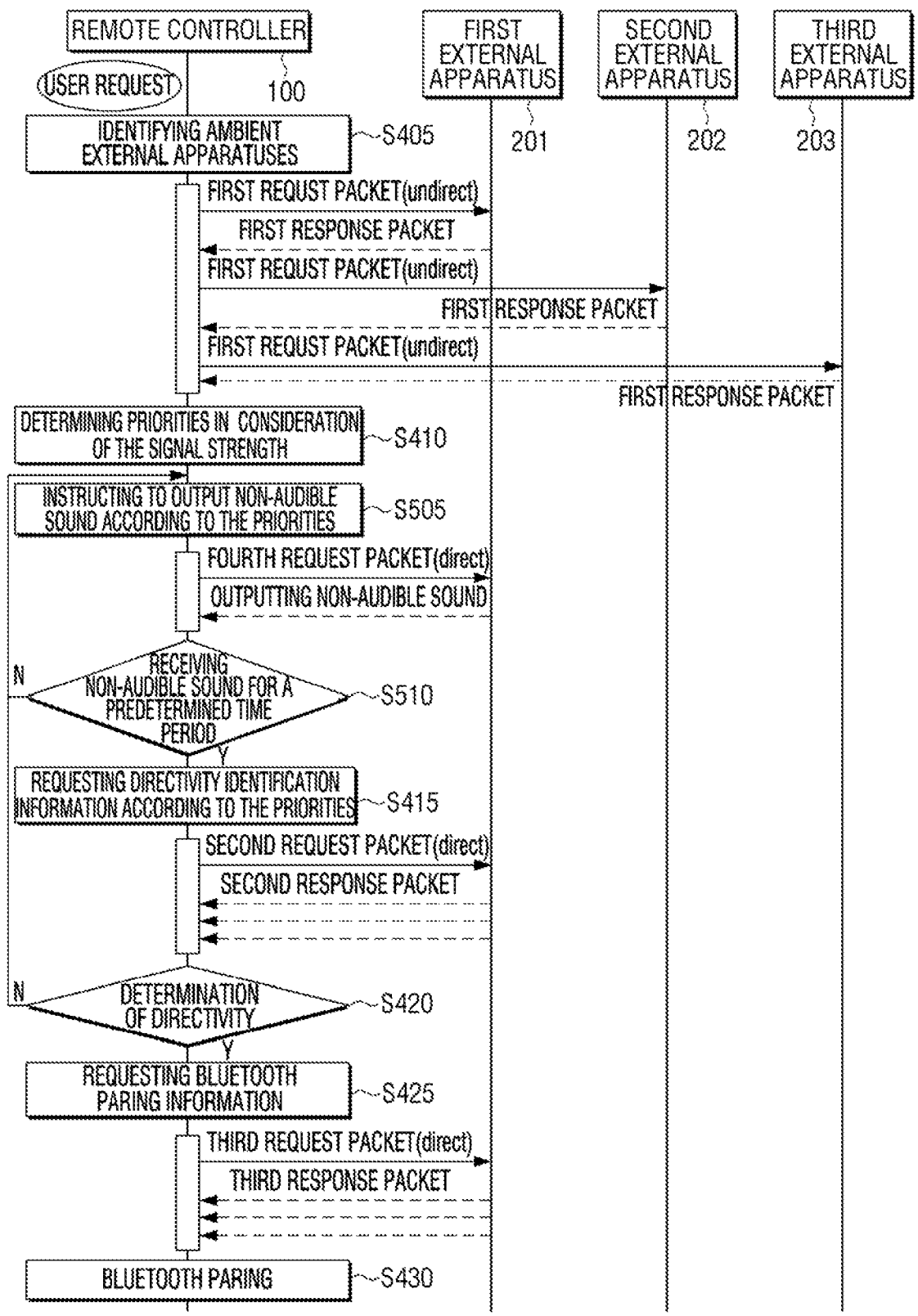
FIG. 6 is a flow chart for illustrating an operation of a remote controller according to the example of FIG. 5.

FIG. 6 is a flow chart for illustrating an operation of a remote controller according to the example of FIG. 5.

Referring to FIG. 6, the remote controller 100 may additionally transmit a control method to output non-audible sound, in addition to the control method according to the example in FIG. 4. The reason for outputting non-audible sound is for determining which apparatus among the plurality of external apparatuses 201 to 203 exists in the same space with the remote controller 100. In case there is an obstacle that physically separates a space like a wall, non-audible sound may not pass through the obstacle. Accordingly, only non-audible sound output at an external apparatus in the same space will be received by the remote controller 100, and non-audible sound output at an external apparatus that is not in the same space may not be received by the remote controller 100.

That is, if non-audible sound is output at an external apparatus, a user may not recognize this, but the remote controller 100 may recognize the non-audible sound. Accordingly, if non-audible sound is not received for a predetermined time period, the remote controller 100 may identify that the external apparatus is not in the same space.

Referring to FIG. 6, the remote controller 100 may transmit a fourth request packet to an external apparatus according to the priorities. The fourth request packet may include a control command to output non-audible sound. Also, the fourth request packet may be a directed advertising packet.

At operation S410, the remote controller 100 may analyze the first response packet respectively received from the plurality of external apparatuses 201 to 203, and set the priorities based on the signal strength. Then, at operation S505, the remote controller 100 may transmit the fourth request packet to an external apparatus having the highest priority. The external apparatus that received the fourth request packet may output non-audible sound.

The remote controller 100 may receive non-audible sound from an external apparatus for a predetermined time period. If non-audible sound is received at operation S510, the remote controller 100 may determine that the external apparatus is in the same space. Also, when it is identified that the external apparatus is in the same space, the remote controller 100 may request directivity identification information to the apparatus at operation S415. Then, the remote controller 100 may transmit a second request packet requesting directivity identification information to the apparatus. The processes after that are identical to those mentioned with respect to FIG. 4.

Meanwhile, if the remote controller 100 does not receive non-audible sound from an external apparatus for a predetermined time period, the remote controller 100 may determine that the external apparatus is not in the same space. Then, the remote controller 100 may transmit a fourth request packet to an external apparatus having the next highest priority.

The remote controller 100 may transmit a fourth request packet to external apparatuses according to the priorities until non-audible sound is received. In case non-audible sound is not received even though a fourth request packet was sent to all external apparatuses, the remote controller 100 may end an operation for Bluetooth pairing.

Figure 7:
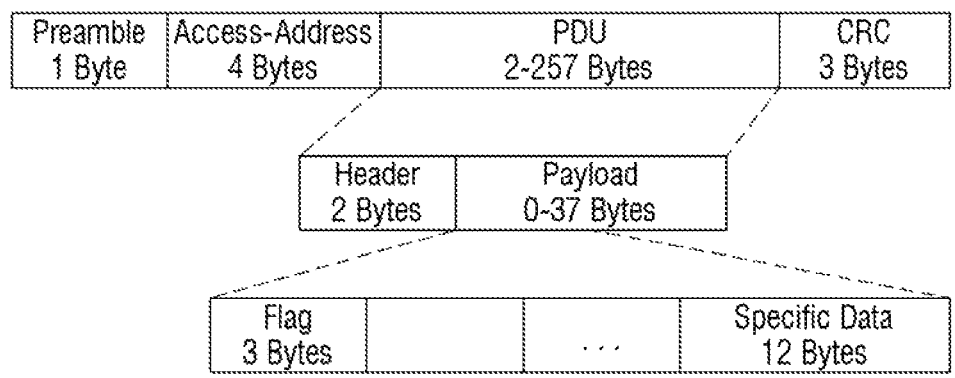
FIG. 7 is a diagram for illustrating a format of an advertising packet.

FIG. 7 is a diagram for illustrating a format of an advertising packet.

An advertising packet may refer to a packet that is used when sending a signal to an ambient device (observer) periodically at an advertiser (broadcaster).

Referring to FIG. 7, a format of an advertising packet may consist of preamble, access-address, packet data unit (PDU), and CRC parts. Meanwhile, the PDU part may consist of a header portion and a payload portion. Also, the payload portion may include a space including specific data.

An advertising packet may be a packet that is transmitted from the advertiser arbitrarily, without consideration of whether another ambient device (observer) is in a state of being able to receive a signal. Also, if an advertising packet is used, the advertiser may communicate with a plurality of ambient devices (observers).

An advertising packet may be divided into an undirected advertising packet and a directed advertising packet, depending on whether it includes information of a MAC address of an apparatus transmitting a specific signal and a MAC address of an apparatus receiving a specific signal in its inside.

A directed advertising packet may include information of a MAC address of an apparatus transmitting a specific signal and a MAC address of an apparatus receiving a specific signal. Meanwhile, an undirected advertising packet may not include information of a MAC address of an apparatus transmitting a specific signal and a MAC address of an apparatus receiving a specific signal.

Figure 8:
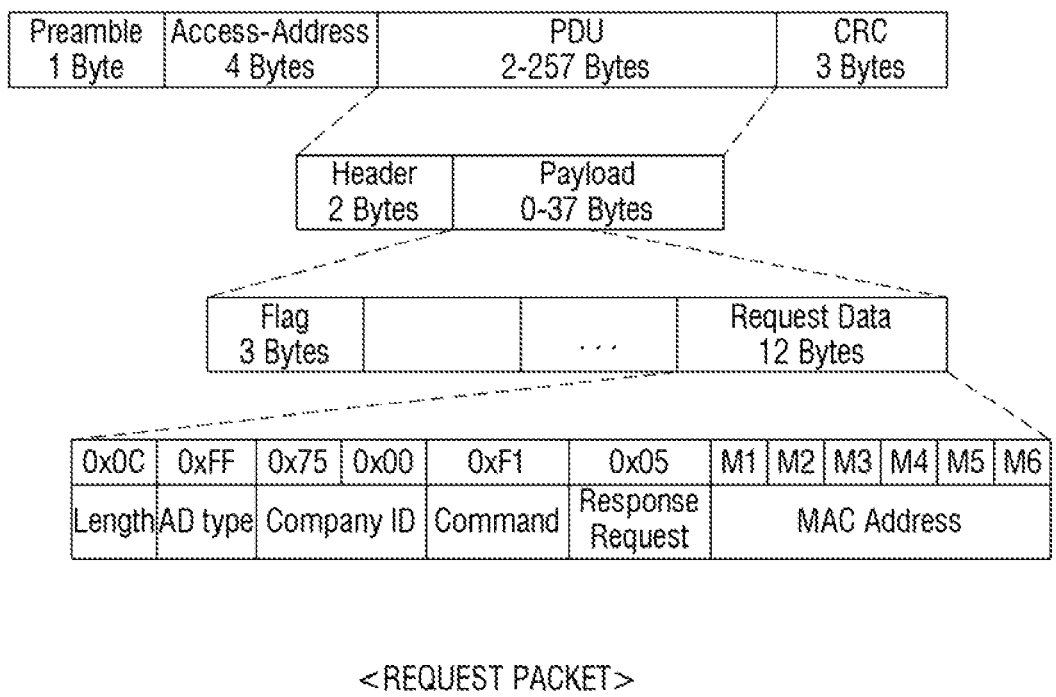
FIG. 8 is a diagram for illustrating a format of a request packet according to an embodiment of the disclosure.

FIG. 8 is a diagram for illustrating a format of a request packet according to an embodiment of the disclosure.

Referring to FIG. 8, an area allotted to specific data of an advertising packet may include a content related to request of a response. A content related to request of a response may refer to information requested from a remote controller to an ambient external apparatus. For example, it may be identification information for determining directivity or identification information for Bluetooth pairing.

Also, a request packet may include request data in the payload portion of an advertising packet. An area of request data may include information such as the length, AD type, company ID, command, response request, MAC address, etc. Meanwhile, an area of response request may include a content requested to a receiving device.

Figure 9:
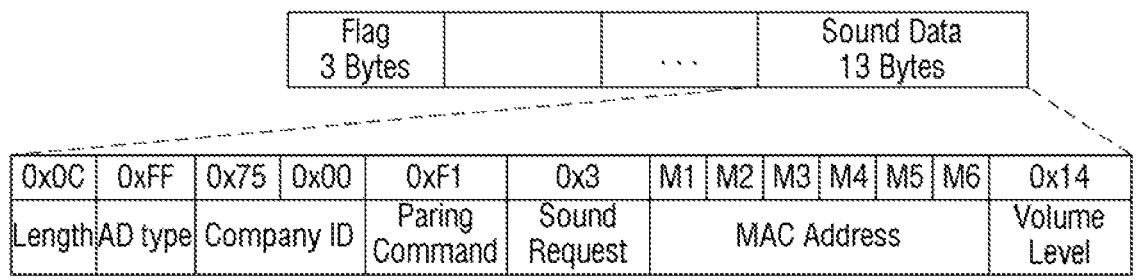
FIG. 9 is a diagram for illustrating a format of a non-audible sound request packet according to an embodiment of the disclosure.

FIG. 9 is a diagram for illustrating a format of a non-audible sound request packet according to an embodiment of the disclosure.

Referring to FIG. 9, an advertising packet may include information which is a content requesting to output non-audible sound. The remote controller 100 may include a control command signal to output non-audible sound in an area allotted to specific data of an advertising packet.

A non-audible sound request packet may include an area related to sound data, and an area related to sound data may include information such as the length, AD type, company ID, pairing command, sound request, MAC address, volume level, etc.

FIG. 10 is a flow chart for illustrating a control method for a remote controller according to an embodiment of the disclosure.

A remote controller 100 according to an embodiment of the disclosure may broadcast a first request packet for identifying an external apparatus located around the remote controller 100 at operation S1005.

Then, when a first response packet for the first request packet is received from each of a plurality of external apparatuses, the remote controller 100 may identify the priorities of the plurality of external apparatuses based on the signal strength of the first response packet at operation S1010.

Also, the remote controller 100 may transmit a second request packet for identifying directivity to a first external apparatus among the plurality of external apparatuses according to the priorities at operation S1015.

Then, when a second response packet for the second request packet is received from the first external apparatus, the remote controller 100 may identify directivity for the first external apparatus based on the second response packet at operation S1020.

Also, if it is identified that the remote controller 100 is directed to the first external apparatus, the remote controller 100 may transmit a third request packet for Bluetooth pairing to the first external apparatus at operation S1025.

Meanwhile, at operation S1020, if it is identified that the remote controller 100 is not directed to the first external apparatus, the remote controller 100 may transmit a second request packet to the second external apparatus among the plurality of external apparatuses according to the priorities.

Also, the first request packet may be an undirected advertising packet including information corresponding to request to transmit the first response packet, the second request packet may be a directed advertising packet including identification information of the first external apparatus and information corresponding to request to transmit the second response packet, and the third request packet may be a directed advertising packet including identification information of the first external apparatus and information corresponding to request for pairing.

In addition, at operation S1010, the remote controller 100 may grant a higher priority to an external apparatus that transmitted the first response packet as the signal strength of the first response packet is larger.

Further, the remote controller 100 may transmit a fourth request packet for locality check to the first external apparatus to which the highest priority was granted according to the priorities. Then, when non-audible sound output in response to the fourth request packet is received from the first external apparatus, the remote controller 100 may transmit the second request packet to the first external apparatus.

Meanwhile, in case non-audible sound is not output from the first external apparatus for a predetermined time period after transmission of the fourth request packet, the remote controller 100 may transmit the fourth request packet to the second external apparatus among the plurality of external apparatuses according to the priorities.

Also, in case the remote controller 100 determines that the identified degree of directivity for the first external apparatus is outside a predetermined error range, the remote controller 100 may transmit a second request packet for identifying directivity to a second external apparatus among a plurality of external apparatuses according to the priorities.

Then, when a second response packet for the second request packet is received from the second external apparatus, the remote controller 100 may identify the degree of directivity for the second external apparatus. Also, the remote controller 100 may compare the degree of directivity for the first external apparatus and the degree of directivity for the second external apparatus, and select one between the first external apparatus and the second external apparatus.

In addition, the remote controller 100 may compare the degree of directivity for the first external apparatus and the degree of directivity for the second external apparatus, and transmit a third request packet for Bluetooth pairing to the external apparatus having a relatively large degree of directivity.

Here, the second response packet is a packet to which a constant tone for determination of directivity is synthesized, and the remote controller 100 may, based on phase differences of the second response packets respectively received through a plurality of communicators 110, identify directivity for the first external apparatus.

A control method for the remote controller 100 as in FIG. 10 may be executed on a remote controller having the configuration as in FIG. 1 or FIG. 2, or the method may also be executed on a remote controller having a different configuration.

In a non-transitory computer readable medium storing computer instructions for making an electronic apparatus perform operations in case the instructions are executed by the processor 120 of the electronic apparatus according to an embodiment of the disclosure, the operations include the operations of broadcasting a first request packet for identifying external apparatuses located around the remote controller 100, and based on a first response packet for the first request packet being received from each of a plurality of external apparatuses, identifying the priorities of the plurality of external apparatuses based on the signal strength of the first response packet, transmitting a second request packet for identifying directivity to a first external apparatus among the plurality of external apparatuses according to the priorities, and based on a second response packet for the second request packet being received from the first external apparatus, identifying directivity for the first external apparatus based on the second response packet, and based on identifying that the remote controller 100 is directed to the first external apparatus, transmitting a third request packet for Bluetooth pairing to the first external apparatus.

Meanwhile, the methods according to the aforementioned various embodiments of the disclosure may be implemented in the forms of applications that may be installed on a conventional remote controller.

Also, the methods according to the aforementioned various embodiments of the disclosure may be implemented just by software upgrade, or hardware upgrade of a conventional remote controller.

Further, the aforementioned various embodiments of the disclosure may also be performed through an embedded server provided on a remote controller, or through an external server of a remote controller.

Meanwhile, a control method for a remote controller according to the aforementioned embodiment may be implemented as a program and provided to a remote controller. In particular, a program including a control method for a remote controller may be provided while being stored in a non-transitory computer readable medium.

Also, the various embodiments described so far may be implemented in a recording medium that is readable by a computer or a device similar thereto, by using software, hardware or a combination thereof. According to implementation by hardware, the embodiments described in the disclosure may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors or an electronic unit for performing various functions. In some cases, the embodiments described in this specification may be implemented by a processor 120 itself. According to implementation by software, the embodiments such as processes and functions described in this specification may be implemented by separate software modules. Each of the software modules may perform one or more functions and operations described in this specification.

Meanwhile, computer instructions for performing processing operations at a remote controller according to the aforementioned various embodiments of the disclosure may be stored in a non-transitory computer-readable medium. Such a non-transitory computer-readable medium makes processing operations at a remote controller according to the aforementioned various embodiments of the disclosure performed by a specific apparatus when the instructions are executed by the processor of the specific apparatus.

A non-transitory computer-readable medium refers to a medium that stores data semi-permanently, and is readable by machines, but not a medium that stores data for a short moment such as a register, a cache, and memory. As specific examples of a non-transitory computer-readable medium, there may be a CD, a DVD, a hard disc, a blue-ray disc, a USB, a memory card, a ROM and the like.

So far, the embodiments of the disclosure have been described as Bluetooth signals, but in the disclosure, various radio frequency (RF) signals may be applied, in addition to Bluetooth signals.

While the disclosure has been shown and described with reference to preferred embodiments thereof, the disclosure is not limited to the aforementioned specific embodiments, and it is apparent that various modifications can be made by those having ordinary skill in the technical field to which the disclosure belongs, without departing from the gist of the disclosure as claimed by the appended claims. Also, it is intended that such modifications are not to be interpreted independently from the technical idea or prospect of the disclosure.

What is claimed is:

1. A remote controller comprising:
a communicator; and
a processor configured to:
control the communicator to broadcast a first request packet for identifying a plurality of external apparatuses located around the remote controller,
based on a first response packet to the first request packet being received by the communicator from each of the plurality of external apparatuses, identify a priority of each of the plurality of external apparatuses based on a signal strength of each of the first response packets, and control the communicator to transmit a second request packet to a first external apparatus among the plurality of external apparatuses according to the identified priorities,
based on a second response packet to the second request packet being received by the communicator from the first external apparatus, identify a degree of directivity for the first external apparatus based on the second response packet, and
based on the identified degree of directivity indicating that the remote controller is directed to the first external apparatus, control the communicator to transmit a third request packet for Bluetooth pairing to the first external apparatus.

2. The remote controller of claim 1,
wherein the processor is further configured to:
based on the identified degree of directivity indicating that the remote controller is not directed to the first external apparatus, control the communicator to transmit the second request packet to a second external apparatus among the plurality of external apparatuses according to the identified priorities.

3. The remote controller of claim 1,
wherein the first request packet is an undirected advertising packet including information corresponding to a request to transmit the first response packet,
the second request packet is a directed advertising packet including identification information of the first external apparatus and information corresponding to a request to transmit the second response packet, and
the third request packet is a directed advertising packet including identification information of the first external apparatus and information corresponding to a request for pairing.

4. The remote controller of claim 1,
wherein the processor is further configured to:
grant a higher priority to the first external apparatus that transmitted the first response packet as the signal strength of the first response packet is larger.

5. The remote controller of claim 4,
wherein the processor is further configured to:
control the communicator to transmit a fourth request packet for a locality check to the first external apparatus to which the highest priority was granted according to the priorities, and
based on a non-audible sound output in response to the fourth request packet being received from the first external apparatus, control the communicator to transmit the second request packet to the first external apparatus.

6. The remote controller of claim 5,
wherein the processor is further configured to:
based on the non-audible sound not being output from the first external apparatus for a predetermined time period after transmission of the fourth request packet, control the communicator to transmit the fourth request packet to the second external apparatus among the plurality of external apparatuses according to the priorities.

7. The remote controller of claim 1,
wherein the processor is further configured to:
based on the identified degree of directivity for the first external apparatus exceeding a predetermined error range, transmit the second request packet to the second external apparatus among the plurality of external apparatuses according to the priorities,
based on the second response packet for the second request packet being received from the second external apparatus, identify a degree of directivity for the second external apparatus, and
compare the degree of directivity for the first external apparatus and the degree of directivity for the second external apparatus, and identify whether the remote controller is directed to the first external apparatus or the second external apparatus.

8. The remote controller of claim 7,
wherein the processor is further configured to:
compare the degree of directivity for the first external apparatus and the degree of directivity for the second external apparatus, and control the communicator to transmit the third request packet for Bluetooth pairing to the external apparatus for which the degree of directivity is larger.

9. The remote controller of claim 1,
wherein the second response packet is a packet to which a constant tone for determination of directivity is synthesized, and
the processor is further configured to:
based on phase differences of the second response packets respectively received through the communicators, identify the degree of directivity for the first external apparatus.

10. A control method for a remote controller, the control method comprising:
broadcasting, by the remote controller, a first request packet for identifying a plurality of external apparatuses located around the remote controller;
based on a first response packet to the first request packet being received by the remote controller from each of the plurality of external apparatuses, identifying a priority of each of the plurality of external apparatuses based on a signal strength of each of the first response packets;
transmitting, by the remote controller, a second request packet to a first external apparatus among the plurality of external apparatuses according to the identified priorities;
based on a second response packet to the second request packet being received by the remote controller from the first external apparatus, identifying a degree of directivity for the first external apparatus based on the second response packet; and
based on the identified degree of directivity indicating that the remote controller is directed to the first external apparatus, transmitting, by the remote controller, a third request packet for Bluetooth pairing to the first external apparatus.

11. The control method of claim 10, further comprising:
based on the identified degree of directivity indicating that the remote controller is not directed to the first external apparatus, transmitting the second request packet to the second external apparatus among the plurality of external apparatuses according to the identified priorities.

12. The control method of claim 10,
wherein the first request packet is an undirected advertising packet including information corresponding to a request to transmit the first response packet,
the second request packet is a directed advertising packet including identification information of the first external apparatus and information corresponding to a request to transmit the second response packet, and
the third request packet is a directed advertising packet including identification information of the first external apparatus and information corresponding to a request for pairing.

13. The control method of claim 10,
wherein identifying the priorities of the plurality of external apparatuses comprises:
granting a higher priority to the first external apparatus that transmitted the first response packet as the signal strength of the first response packet is larger.

14. The control method of claim 13, further comprising:
transmitting a fourth request packet for a locality check to the first external apparatus to which the highest priority was granted according to the priorities; and
based on a non-audible sound output in response to the fourth request packet being received from the first external apparatus, transmitting the second request packet to the first external apparatus.

15. The control method of claim 14, further comprising:
based on the non-audible sound not being output from the first external apparatus for a predetermined time period after transmission of the fourth request packet, transmitting the fourth request packet to the second external apparatus among the plurality of external apparatuses according to the priorities.

16. The control method of claim 10, further comprising:
based on the identified degree of directivity for the first external apparatus exceeding a predetermined error range, transmitting the second request packet to the second external apparatus among the plurality of external apparatuses according to the priorities;
based on the second response packet for the second request packet being received from the second external apparatus, identifying a degree of directivity for the second external apparatus; and
comparing the degree of directivity for the first external apparatus and the degree of directivity for the second external apparatus, and identifying whether the remote controller is directed to the first external apparatus or the second external apparatus.

17. The control method of claim 16, further comprising:
comparing the degree of directivity for the first external apparatus and the degree of directivity for the second external apparatus, and transmitting the third request packet for Bluetooth pairing to the external apparatus for which the degree of directivity is larger.

18. The control method of claim 10,
wherein the second response packet is a packet to which a constant tone for determination of directivity is synthesized, and
based on phase differences of the second response packets respectively received through a plurality of communicators, the degree of directivity for the first external apparatus is identified.

19. A non-transitory computer readable medium storing computer instructions to cause an electronic apparatus to perform operations when the instructions are executed by a processor of the electronic apparatus, wherein the operations comprise:

broadcasting, by the electronic apparatus, a first request packet for identifying a plurality of external apparatuses located around the remote controller;

based on a first response packet to the first request packet being received by the electronic apparatus from each of the plurality of external apparatuses, identifying a priority of each of the plurality of external apparatuses based on a signal strength of each of the first response packets;

transmitting, by the electronic apparatus, a second request packet to a first external apparatus among the plurality of external apparatuses according to the identified priorities;

based on a second response packet to the second request packet being received by the electronic apparatus from the first external apparatus, identifying a degree of directivity for the first external apparatus based on the second response packet; and based on the identified degree of directivity indicating that the remote controller is directed to the first external apparatus, transmitting, by the electronic apparatus, a third request packet for Bluetooth pairing to the first external apparatus.

* * * * *